United States Patent Office 3,531,243
Patented Sept. 29, 1970

3,531,243
PREPARATION OF MORDENITE
Robert William Aitken, Chamberley, Surrey, and Ian Montgomery Keen, Ashford, England, assignors to The British Petroleum Company, London, England, a corporation of England
No Drawing. Filed Aug. 30, 1967, Ser. No. 664,307
Claims priority, application Great Britain, Sept. 14, 1966, 41,079/66
Int. Cl. C01b *33/28*
U.S. Cl. 23—113                2 Claims

ABSTRACT OF THE DISCLOSURE

The synthetic gel which is the precursor for the preparation of mordenite is aged, preferably at atmospheric temperature and pressure, for at least 1 week before it is hydrothermally converted to mordenite. The mordenites produced are of high surface area, due, it is believed, to the absence of amorphous material.

Preferably, the gel has its pH adjusted to 10–10.8 before the ageing and it may have the following ratios of components.

| | |
|---|---:|
| $Na_2O:SiO_2$ | 0.195–0.215:1 |
| $SiO_2:Al_2O_3$ | 11.6–11.8:1 |
| $H_2O:Na_2O$ | 60–104:1 |
| $Na_2O:Al_2O_3$ | 2.3–2.5:1 |

---

This invention relates to the preparation of mordenite of high surface area.

Mordenite is a zeolite which occurs naturally but which can also be prepared synthetically. The sodium form has the approximate composition $$Na_2O:Al_2O_3:9-11SiO_2.nH_2O$$

Various prior proposals have been made for preparing mordenite but all the methods are similar in that they involve the hydrothermal treatment at elevated temperature and pressure of an amorphous material having a composition fairly close to that of the crystalline mordenite itself. This amorphous material may be a naturally occurring product such as pumice or it may be an artificial amorphous gel precipitated from an aqueous mixture containing sodium, aluminium, silicon, oxygen and hydrogen (for example from an aqueous mixture of sodium aluminate, sodium silicate and silica sol).

The present invention is concerned with the preparation of mordenite from synthetic sodium aluminosilicate gels. It has been found that, even when operating the process to get good yields of mordenite, variations can occur which markedly affect the value of the mordenite as an adsorbent and catalyst component. Very wide variations in surface area of the mordenite can be obtained from apparently similar preparations.

Without being bound by any theory it is postulated that, in certain preparations, a small amount of other material is formed which blocks the openings in the mordenite and gives abnormally low surface areas. To avoid the low surface areas it is necessary for the artificial gel, while still amorphous, to be in some ordered state so that the subsequent hydrothermal treatment can effect rapid and efficient conversion of the gel to mordenite. This theory is supported by the fact that the low surface area mordenites do contain significant amounts of amorphous material or other zeolites.

According to the present invention therefore a process for the preparation of mordenite comprises forming an amorphous gel containing sodium, aluminium, silicon, oxygen and hydrogen from an aqueous mixture of sodium aluminate and a source of silica, ageing the gel for at least 1 week and then hydrothermally converting the gel at elevated temperature and pressure to mordenite having a surface area of at least 100 m.²/g.

The formation of the amorphous gel may conveniently be carried out at atmospheric temperature and pressure from a mixture having the following molar oxide ratios:

| | |
|---|---:|
| $Na_2O:SiO_2$ | 0.195–0.215:1 |
| $SiO_2:Al_2O_3$ | 11.6–11.8:1 |
| $H_2O:Na_2O$ | 60–104:1 |
| $Na_2O:Al_2O_3$ | 2.3–2.5:1 |

The source of silica is preferably a silica sol together with sodium silicate.

The amorphous gel formed from this mixture is then aged for at least 1 week, preferably from 1 to 4 weeks. This ageing may also be carried out at atmospheric temperature and pressure and hence requires no expensive or elaborate equipment. The gel is likely to be alkaline and according to a particular preferred embodiment the pH of the gel is adjusted initially to a pH of 10.0 to 10.8. This can conveniently be done by the addition of HCl. The pH scarcely changes during the ageing period but generally increases during hydrothermal treatment becoming, for example, about 11 at the end of the treatment.

The hydrothermal treatment of the aged gel may be carried out at temperatures of from 120° to 300° C. and at elevated pressure, which is conveniently obtained by carrying out the hydrothermal treatment in an autoclave. The time necessary for the production of wholly crystalline mordenite may be determined by experiment and will be shorter at the higher temperatures. Convenient times may be from 10 to 30 hours.

Provided the required ageing period for the gel is given then the mordenite produced will have a surface area, as measured by low temperature nitrogen adsorption, of at least 100 m.²/g., and they may have a surface area of at least 150 m.²/g. The sodium mordenite may be used, if desired, as such but the usefulness of the sodium form may be limited by the size of the channels. It has been shown by X-ray diffraction studies that dehydrated mordenite contains main pores which are nonintersecting and which, ignoring the presence of cations, have a cross section 7.1 A. by 5.9 A. It has also been shown that the main pores have side pockets of minimum diameter 2.9 A.

It may be desirable to replace the sodium cations, using conventional base exchange techniques, by other metallic cations. The sodium cations can also be replaced by hydrogen ions and in this form the mordenite is in what is now commonly known as the "decationised" form. The decationisation treatment is normally carried out in one of two ways. According to the first method a sodium mordenite is base exchanged with ammonium cations. The ammonium form is then heated to drive off ammonia, leaving behind the hydrogen form or decationised mordenite. It is possible that some of the hydrogen ions are also driven off leaving behind free sites in the mordenite crystal lattice, but this is not altogether clear. According to the second method the mordenite may be treated with a mineral acid, for example hydrochloric or sulphuric acid in order directly to decationise the mordenite. A combination of acid treatment and ammonium treatment can also be used. Preferably the sodium content is reduced to an amount less than 2% wt. of the mordenite, and preferably less than 0.5 wt. of the mordenite. In the direct acid treatment, in addition to the replacement of metal cations by hydrogen, aluminium atoms can be removed from the mordenite lattice if a strong acid is used, for example with from 5–50% wt. strength acid, particularly 10–20% wt. strength. With such strong acid treatment the $SiO_2:Al_2O_3$ ratio in mordenite can be increased from 9–11:1 to at least 14:1, particularly 16–25:1. The mordenite which has been decationised by strong acid treatment is capable of sorbing neopentane which has an effective diameter of between 7 and 8 A., i.e., the maximum cross-sectional dimension of the main pores has been increased. For certain catalytic uses described hereafter, it is particularly preferred to use a mordenite having a $SiO_2:Al_2O_3$ ratio of at least 14:1, particularly 16–25:1 as a result of decationisation by treatment with strong mineral acid.

Decationisation by the combination of acid treatment with simultaneous removal of aluminium and ammonium exchange may further increase the original surface area to a level of at least 400 m.$^2$/g.

The mordenite may also be treated to add a metal component having additional catalytic properties, for example a metal having hydrogenating activity selected from Groups VI$a$ and VIII of the Periodic Table. The hydrogenating component is preferably a platinum group metal, particularly platinum or palladium, and it is preferably added by ion-exchange. Where a decationised mordenite prepared by the ammonia route is employed, the metal is preferably added after the ammonium exchange but before the heat treatment to drive off the ammonia. Even when the mordenite is decationised by the direct acid treatment, it may be desirable to treat the thus decationised mordenite with ammonia or a solution containing ammonium ions before loading the mordenite with the hydrogenating metal ions; such as treatment improves the ion exchange procedure for loading the mordenite. The amount of the platinum group metal is preferably within the range 0.01 to 10% wt., particularly 0.1 to 5% wt. However, iron group metals, particularly nickel, also gives useful results and they may be used in amounts similar to the platinum group metals. Mixtures of certain Group VI and VIII metals and compounds may also be used, e.g., cobalt and molybdenum.

Reactions known to be catalysed by mordenite, particularly decationised mordenite, include cracking, isomerisation, reforming, alkylation, polymerisation and disproportionation. A particularly suitable use for decationised mordenite containing a hydrogenating component is the selective cracking of normal paraffins in high boiling petroleum fractions, preferably those containing more than 50% vol. of material boiling about 250° C., as described in the complete specification of cognate U.K. patent applications No. 10,628/64 and 26,945/64.

Mordenite prepared according to the present invention may be treated and used in any of the above-mentioned processes, particularly the selective paraffin cracking process.

The invention is illustrated by the following comparative examples.

EXAMPLE 1

Four aqueous sodium aluminosilicate gels of molar oxide composition, 2.5 $Na_2O$, 1.0 $Al_2O_3$, 11.6 $SiO_2$, 230 $H_2O$, were prepared from sodium aluminate solution, sodium metasilicate solution and silica sol using the following quantities of reactants:

Sodium metasilicate, $Na_2SiO_3 \cdot 5H_2O$—76 g. dissolved in 270 g. of water.
Silica sol (containing 29 weight percent $SiO_2$)—488 ml.
Sodium aluminate—50 g. dissolved in 100 g. of water.

The silica sol was run into the vigorously paddled metasilicate solution during one hour when gelation occurred. The resultant gel was stood overnight prior to the addition of the sodium aluminate solution, which was made over a period of one and a half hours. The aluminosilicate gel was stirred for an additional four hours until homogeneous. This was allowed to stand for 60 hours.

The four gels designated A, B, C and D respectively were then given further treatment as follows. Gels A, B and C had their pH immediately adjusted to 10.4 by the addition of hydrochloric acid. Gel D was not so treated and had a pH of 11.3. Gels B and C were aged at room temperature and pressure for, respectively, 3 weeks and 1 week. Gels A and D were not aged. The four gels were then hydrothermally treated at 235° C. for 26 hours in an autoclave.

In a further preparation of Gel C on ten times the scale indicated above, the gel, after standing for 48 hours, was acidified with hydrochloric acid to a pH of 9.7 which subsequently increased to 10.0. The resultant gel, C′, was then aged at room temperature and pressure for 10 days. C′ was then hydrothermally treated at 235° C. for 15 hours in a mechanically agitated autoclave.

All the preparations produced crystalline mordenite but the surface areas of the mordenites were markedly different as shown by the following Table 1.

TABLE 1

| Gel | pH of gel | Aging period | Surface area, m.$^2$/g. | $SiO_2:Al_2O_3$ ratio | Mordenite produced Weight percent [1] amorphous | Weight percent [1] analcite | Weight percent mordenite |
|---|---|---|---|---|---|---|---|
| A | 10.4 (initial) | <2 days | <1 | 11.8 | ~29 | 0 | 71 |
| B | 10.4 (initial) / 11.0 (final) | 3 weeks | 186 | 11.8 | ~2 | 3 | 95 |
| C | 10.3 (initial) / 10.9 (final) | 1 week | 170 | 11.5 | ~2 | 1 | 97 |
| C′ | 10.0 (initial) / 11.0 (final) | 10 days | 158 | 10.8 | ([2]) | 1 | 99 |
| D | 11.3 (initial) | <2 days | 36 | 8.4 | ([2]) | 40 | 60 |

[1] Determined by X-ray powder diffraction techniques.
[2] Negligible.

The table shows the high surface areas obtained when the gel was aged compared with the low surface areas obtained when there was no ageing. It shows that the low surface areas of the mordenite products are related to their amorphous content. The result with gel D also shows that when the pH was not adjusted and was initially 11.3 the mordenite produced at 235° C. contained analcite.

EXAMPLE 2

Two aqueous sodium aluminosilicate gels of molar oxide composition, 2.3 $Na_2O$, 1.0 $Al_2O_3$, 11.8 $SiO_2$, 150 $H_2O$, were prepared by a method analogous to that described in Example 1 using the following reactant quantities:

Sodium metasilicate—152 g. dissolved in 540 g. of water.
Silica gel—975 ml.
Sodium aluminate—100 g. dissolved in 200 g. of water.

The metasilicate solution was added during ¾ hour to the silica sol, with vigorous paddling. The sodium aluminate solution was then added to the resultant, stirred gel over half an hour and the product allowed to stand overnight. The gel was finally paddled vigorously for seven hours until homogeneous. These gels, designated E and F respectively, were hydrothermally treated in an autoclave at 160° C. for 26 hours without any ageing or adjustment of the pH of 11.5. Mordenite was produced in both cases (SiO$_2$:Al$_2$O$_3$ ratios of 9.3 and 9.1) but the surface area of both mordenites was <1 m.$^2$/g. The results which are shown in Table 2 below were thus comparable with gel A in Example 1 and show that the temperature of the hydrothermal treatment (235° C. in Example 1, 160° C. in Example 2) has no significant effect on the surface area of the mordenite.

TABLE 2

| Gel | pH of gel (initial) | Aging period, days | Mordenite produced | | | | |
|---|---|---|---|---|---|---|---|
| | | | Surface area, m.$^2$/g. | SiO$_2$:Al$_2$O$_3$ ratio | Weight percent[1] amorphous | Weight percent[1] analcite | Weight percent mordenite |
| E | 11.5 | <1 | <1 | 9.3 | ~35 | 17 | 48[1] |
| F | 11.5 | <1 | <1 | 9.1 | ~37 | 1.5 | 61 |

[1] Determined by X-ray powder diffraction techniques.

EXAMPLE 3

The high surface area mordenites from gels B and C and the low surface area mordenite from gel E were converted into catalysts containing 0.5% wt. of platinum in four successive stages.

Firstly, each sodium-mordenite was refluxed for 4 hours with 20 percent weight sulphuric acid at a sulphuric acid/mordenite weight ratio (g./g.) of 0.8. The products were reslurried in deionised water until sulphate-free and then dried overnight at 130° C.

Secondly, the acid-treated mordenites were base-exchanged with 3.5 N ammonium chloride solution at reflux for 4 hours. The weight ratio of powdered mordenite to solid ammonium chloride was 0.8. The products were reslurried in deionised water until chloride-free and then dried overnight at 130° C.

Thirdly, the ammonium-mordenites were exchanged in aqueous slurry at ambient temperatures with aqueous tetrammine platinous chloride to the required loading, i.e., to 0.5 weight percent platinum on the finished catalyst. The slurries, prior to exchange, contained approximately 1.5 g. water per gram of dry mordenite powder. The tetrammine platinous chloride solutions were prepared in the same weights of water as used for the individual slurries and were added, with stirring, over the course of five hours. These slurries were then stirred overnight for 16 hours. The catalysts were slurried in deionised water until chloride-free and dried overnight at 130° C.

Finally, the catalysts were calcined in an air-stream (2000 v./v./hr.) from ambient temperatures to 500° C. in a series of steps. This procedure decomposed the ammonium and the tetrammine platinous cations to liberate ammonia in addition to driving off water from the molecular sieve catalysts. Thus the decationization of the catalysts was finally completed.

Each catalyst was then used to treat raw Libyan Wax Distillate boiling above 360° C. and having 32.4 weight percent wax content and a pour point of 46° C. The process conditions used for the selective wax cracking were 2 liquid hourly space velocity, 700° F., 1000 p.s.i.g., and hydrogen at 10,000 s.c.f./brl.

The surface areas of the finished catalysts and their activity as measured by the pour point reduction obtained are given in Table 3 below:

TABLE 3

| Gel | Sodium mordenite surface area, m.$^2$/g. | Finished catalyst surface area, m.$^2$/g. | Catalyst activity (pour point reduction obtained), °C. |
|---|---|---|---|
| B | 186 | 428 | 61.0 |
| C | 170 | 431 | 60.0 |
| E | <1 | 160 | 0 |

It will be readily seen from Table 3 that the high surface area mordenites prepared according to the present invention give much more active catalysts than the low surface area mordenite.

We claim:
1. A process for the preparation of mordenite comprising forming an amorphous gel containing sodium, aluminium, silicon, oxygen and hydrogen from an aqueous mixture of sodium aluminate and a source of silica having the following molar oxide ratios:

Na$_2$O:SiO$_2$ ---------------------------- 0.195–0.215:1
SiO$_2$:Al$_2$O$_3$ ------------------------ 11.6–11.8:1
H$_2$O:Na$_2$O ----------------------------- 60–104:1
Na$_2$O:Al$_2$O$_3$ ------------------------ 2.3–2.5:1 adjusting the pH of the gel to 10.0 to 10.8; ageing the gel for from 1 to 4 weeks at atmospheric pressure and at a temperature below the crystallization temperature; and then hydrothermally converting the gel from 10 to 30 hours at a temperature of 120–300° C. and elevated pressure to crystalline mordenite having a surface area of at least 100 m.$^2$/g.

2. A process as claimed in claim 1 wherein the mordenite produced is treated with a strong mineral acid to convert it to a hydrogen mordenite having a SiO$_2$:Al$_2$O$_3$ ratio of at least 14:1.

References Cited

UNITED STATES PATENTS

| 2,847,280 | 8/1958 | Estes | 23—113 |
| 2,979,381 | 4/1961 | Gottstine et al. | 23—113 |
| 3,334,964 | 8/1967 | Reid | 23—113 |
| 3,436,174 | 4/1969 | Sand | 23—113 |

FOREIGN PATENTS

| 1,369,377 | 7/1964 | France. |

OTHER REFERENCES

Barrer: "J. Chem. Soc.," 1948, pp. 2158–2163.

EDWARD J. MEROS, Primary Examiner

U.S. Cl. X.R.

252—455